(12) United States Patent
Park

(10) Patent No.: US 6,828,375 B2
(45) Date of Patent: Dec. 7, 2004

(54) ELECTROCONDUCTIVE POLYAMIDE RESIN COMPOSITION AND MOLDED PRODUCT FOR MOTOR COMPONENT PREPARED THEREFROM

(75) Inventor: Soo-Chul Park, Ichon (KR)

(73) Assignee: Hyundai Motor Company, Seoul (KR)

( * ) Notice: Subject to any disclaimer, the term of this patent is extended or adjusted under 35 U.S.C. 154(b) by 300 days.

(21) Appl. No.: 10/021,429

(22) Filed: Dec. 19, 2001

(65) Prior Publication Data

US 2002/0128373 A1 Sep. 12, 2002

(30) Foreign Application Priority Data

Dec. 29, 2000 (KR) ........................................ 2000-85827

(51) Int. Cl.⁷ ................................................ C08K 3/04
(52) U.S. Cl. ...................... 524/495; 524/168; 524/169; 524/321; 524/496
(58) Field of Search ................................ 524/168, 169, 524/321, 495, 496

(56) References Cited

U.S. PATENT DOCUMENTS 6,506,830 B1 * 1/2003 Bussi et al. .................. 524/495

* cited by examiner

*Primary Examiner*—Edward J. Cain
(74) *Attorney, Agent, or Firm*—Antonelli, Terry, Stout & Kraus, LLP

(57) ABSTRACT

Disclosed is an electrically conductive polyamide resin composition, which is advantageous in light of very excellent flexibility and flowability, suitable for use in extrusion and injection components for motor vehicles requiring impact resistance and electroconductivity. The polyamide resin composition comprises (a) 40–70% by weight of semi-crystalline polyamide resin, (b) 15–40% by weight of thermoplastic elastomer grafted with 0.5–2.0% by weight of maleic anhydride, (c) 9–20% by weight of carbon black powder, (d) 1–10% by weight of sulfonamide based material, and (e) 0.001–0.02% by weight of dicarboxyl based material.

11 Claims, No Drawings

ELECTROCONDUCTIVE POLYAMIDE RESIN COMPOSITION AND MOLDED PRODUCT FOR MOTOR COMPONENT PREPARED THEREFROM

BACKGROUND OF THE INVENTION

1. Field of the Invention

The present invention pertains to a polyamide resin composition, and more specifically, to an electroconductive polyamide resin composition having high flowability, suitable for use in molding extrusion or injection components for motor vehicles requiring flexibility, impact resistance and conductivity, for example, a fuel filter housing, a fuel line, a fuel inlet tube, a fuel tank and the like that deliver fuel to a motor vehicle engine.

2. Description of the Prior Art

In general, polyamide resins are excellent in mechanical properties (e.g., tensile strength, flexible strength and elastic modulus), heat resistance and chemical resistance, and thus can be variously applied in the fields of all industries including motor vehicles, or sports. Compositions having diverse functionalities have also been applicable to many components for motor vehicles. These days, in fuel system component materials for motors, plastics have been substituted for conventional metallic materials owing to their lightweight properties, low cost and no erosion in motors. Further, polyamide resin has excellent resistance against gasoline and is employed to most fuel system components. Although a fuel filter housing or a fuel line in fuel system components should be resistant against gasoline, since they are in contact with gasoline all the time, such components have until now been made from metallic materials. Thus, polyamide resin having excellent gasoline resistance is suitable for use in preparation of such motor parts.

However, in the case of using polyamide lacking conductivity, a property necessary for fuel system components such as a fuel filter housing and a fuel line, when gasoline is fed to the engine cylinder of motors at a very rapid rate, electrostatic charges are generated due to friction between the fuel and the walls of the fuel line, and are concentrated in any one portion. Such concentrated electrical charges at any point of time are discharged at portions closest to adjacent metals. Continuous generation of such phenomenon results in fine cracks at discharged portions, through which gasoline is leaked, thus causing the danger of fire or explosion. Therefore, such motor components should have electroconductivity, capable of dissipating the static electricity to the vehicle body.

Additionally, the motor components should not be easily broken or cracked upon jarring or collision. In particular, when continuously driven in a cold area, the motor will suffer from such low temperature. So, high impact resistance and flexibility are required for the motor components.

In this regard, U.S. Pat. Nos. 5,164,084 and 5,164,879 disclose a 8% stainless steel fiber-containing polyamide-12 resin composition, which can be applied to a fuel filter housing component with conductivity, gasoline resistance and impact resistance while retaining volume resistivity of $10^6$ Ohm-cm or less. But its preparation cost is very high and the composition is somewhat poor in flexibility and impact resistance. In U.S. Pat. Nos. 4,655,964 and 4,702,859, a polyamide resin composition is difficult to apply to a fuel filter housing, a fuel line and a fuel inlet tube because of its low impact resistance, flexibility and moldability. Japanese Patent No. Sho 58-93756 refers to a composition for application to fuel system components of motor vehicles comprising polyamide resin, ethylene based elastic copolymer and carbon black, from which a molded article is prepared, retaining electroconductivity and impact resistance but not providing high flexibility, impact and flowability. In addition, a composition comprising polyamide resin and 8–20% by weight of metallic fiber and carbon fiber for molding fuel system parts of motor vehicles, disclosed in U.S. Pat. No. 4,569,786, has excellent electroconductivity and mechanical strength, but suffers from the disadvantages of low flexibility, impact strength and flowability. Japanese Patent No. Sho 60-26057 discloses a conductive polyamide resin composition for molding, which comprises polyamide resin, metallic fiber, glass fiber and ethylene ionomer. Such composition is advantageous in light of electroconductivity and mechanical strength, but disadvantageous in terms of impact resistance, flexibility and moldability, thus not being applicable to fuel system parts in motors. A conductive thermoplastic resin composition, disclosed in Japanese Patent Nos. Sho 61-89258 and 61-207465, has excellent electrical conductivity, but has extremely poor impact resistance, flexibility and moldability. In addition, Japanese Patent No. Sho 63-51455 discloses a conductive resin composition prepared by mixing a polyamide resin with an ethylene ionomer and carbon black, to render the composition flexible and conductive. However, as for flexibility, impact resistance and flowability, the above composition does not have sufficient qualities.

U.S. Pat. No. 4,655,964 refers to a conductive nylon composition comprising a linear nylon resin, 20–50% by weight of mineral filler (kaolin, calcium metasilicate) and 4–6% by weight of carbon black, with slight conductivity. But the nylon composition suffers from low impact resistance, flexibility and moldability. Also, in U.S. Pat. No. 4,702,859, a conductive polyamide resin composition comprising 100 parts by weight of xylenediamine and aliphatic dicarboxylic acid-derived polyamide, 5–100 parts by weight of polyamide-66 resin, 30–300 parts by weight of glass fiber, 5–40 parts by weight of carbon black and 5–40 parts by weight of graphite, is excellent in conductivity, mechanical strength, elastic modulus and heat deflection temperature, but very poor in impact resistance and flexibility. As well, preparation cost is high and thus financial loss occurs. EP 0 327 384 refers to a conductive polyacetal composition having improved flexibility and toughness, which meets electrical conductivity standards but suffers from impact resistance, flexibility and moldability insufficient for use in fuel components.

In EP 0 685 527 A1, a composition comprising polyphenylene ether-polyamide resin and 1–7 parts by weight of conductive carbon black, has somewhat satisfactory conductivity, but cannot be applied to fuel components of the motor due to low impact resistance, flexibility and moldability. A composition of EP 0 866 098, which is further developed from the composition of EP 0 685 527 A1, is good in impact resistance, but is very poor in flexibility and moldability. Japanese Patent No. Hei 11-53941 discloses a conductive polyamide resin composition prepared by mixing polyamide resin A obtained from a modified polyethylene, for impact resistance, with carbon black for conductivity, potassium titanate and BBSA, which has slightly improved conductivity, flexibility and impact resistance, but is extremely poor in moldability.

SUMMARY OF THE INVENTION

Leading to the present invention, the intensive and thorough research onto materials suitable for use in fuel system components of motors, carried out by the present inventors aiming to avoid the problems encountered in the prior arts, resulted in the finding that, when a sulfonamide based material is mixed with a dicarboxyl based material, the obtained composition can be improved in various physical properties.

Therefore, the present invention has an object of providing an electroconductive polyamide resin composition, which is advantageous in light of electroconductivity, high impact resistance, high flexibility and moldability, for use in a fuel filter housing, a fuel line, a fuel inlet tube and a fuel tank as fuel system components for motor vehicles.

It is another object of the present invention to provide a molded product for a motor vehicle component prepared from the electroconductive polyamide resin composition.

DETAILED DESCRIPTION OF THE INVENTION

To achieve the above objects, the present invention provides an electroconductive resin composition comprising (a) 40–70% by weight of semi-crystalline polyamide resin; (b) 15–40% by weight of thermoplastic elastomer grafted with 0.5–2.0% by weight of maleic anhydride; (c) 9–20% by weight of carbon black powder; (d) 1–10% by weight of sulfonamide based material, represented by the following formula 1; and (e) 0.001–0.02% by weight of dicarboxyl based material, represented by the following formula 2.

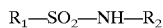　　　　　　　　　　　　　　　Formula 1

(wherein, $R_1$ and $R_2$ are selected from the group consisting of alkyl, benzyl, phenyl, alkylphenyl and dialkylphenyl, wherein the alkyl is $C_nH_{2n+1}$ ($n \leq 8$))

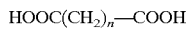　　　　　　　　　　　　　　　Formula 2

Further, the present invention provides an electroconductive resin composition characterized in that the polyamide resin has a relative viscosity of 2.8–3.5, and is selected from the group consisting of polyamide-6, polyamide-66, polyamide resin copolymers thereof, or mixtures thereof.

Also, the present invention provides an electroconductive resin composition characterized in that the conductive carbon black is selected from the group consisting of furnace black, Ketjen black, acetylene black and thermal black, and has a specific surface area (BET) of 500 $m^2$/g or more and an oil absorption (DBP) of 200 ml/100 g or more.

Additionally, the present invention provides an electroconductive resin composition characterized in that the sulfonamide based material is selected from the group consisting of N-propyl benzene sulfonamide, N-butyl benzene sulfonamide, N-hexyl benzene sulfonamide, N-octyl benzene sulfonamide, N-phenyl benzene sulfonamide, N-dimethylphenyl benzene sulfonamide, N-isopropylphenyl benzene sulfonamide, N-butylphenyl benzene sulfonamide, N-methyl methylbenzene sulfonamide, N-ethyl methylbenzene sulfonamide, N-butyl methylbenzene sulfonamide, N-butyl butylbenzene sulfonamide, N-butyl isopropylbenzene sulfonamide, N-butyl butylbenzene sulfonamide, N-phenyl methylbenzene sulfonamide, N-dimethylphenyl methylbenzene sulfonamide, N-isopropylphenyl methylbenzene sulfonamide, or mixtures thereof.

Further, the present invention provides an electroconductive resin composition characterized in that the thermoplastic elastomer is selected from the group consisting of polyethylene, polypropylene, polybutene, polyisoprene ethylene-propylene rubber, ethylene-propylene-diene rubber, ethylene-butene rubber, ethylene-octene rubber, ethylene-acryl rubber, styrene-ethylene-butylene-styrene copolymer, or mixtures thereof.

Furthermore, the present invention provides an electroconductive resin composition characterized in that the relative viscosity of the semi-crystalline polyamide resin is measured for a solution of 1 g of resin in 100 ml of 96% sulfuric acid with Ubbelohde viscometer.

In addition, the present invention provides a molded product for motor vehicle components prepared from the electroconductive resin composition.

Furthermore, the present invention provides a molded product characterized in that the motor components are a fuel filter housing or a fuel line.

Hereinafter, a detailed description will be given of the present invention.

An electroconductive polyamide resin composition of the present invention comprises (a) 40–70% by weight of semi-crystalline polyamide resin, (b) 15–40% by weight of thermoplastic elastomer grafted with 0.5–2.0% by weight of maleic anhydride, (c) 9–20% by weight of carbon black powder, (d) 1–10% by weight of sulfonamide based material, represented by the above formula 1, and (e) 0.001–0.02% by weight of dicarboxyl based material, represented by the above formula 2.

As the polyamide resin (a) of the present invention, use can be made of polyamide-6 resin obtained by polymerizing opened $\epsilon$-caprolactam ring, polyamide-66 resin obtained from hexamethylene diamine and adipic acid, or polyamide resin copolymer obtained by polymerizing $\epsilon$-caprolactam, hexamethylene diamine and adipic acid as monomers used to prepare the polyamide-6 and polyamide-66 resins, at suitable ratios. The resin may be used alone or in combinations thereof, within the range of the present invention. It is most favorable that the selected polyamide resin is 2.8–3.5 in relative viscosity (measured for a solution of 1 g of the resin in 100 ml of 96% sulfuric acid at 23° C. using Ubbelohde viscometer). If the viscosity is below 2.8, flowability is slightly increased but impact resistance is somewhat decreased upon mixing with an equal amount of thermoplastic elastomer. So, in order to reinforce impact resistance, thermoplastic elastomer may be added at larger amounts, but this results in economic loss. Meanwhile, the use of the resin having viscosity above 3.5 results in excellent impact resistance but low flowability.

When 15–40% by weight of thermoplastic elastomer grafted with 0.5–2.0% by weight of maleic anhydride is used, impact resistance can be significantly increased, along with flexibility.

The above component can be chemically reacted with amine groups of polyamide resin, thus increasing its mixing effect. As well, the thermoplastic elastomer is grafted with maleic anhydride and thus is not prevented from being dissolved in gasoline. At high grafted ratios of maleic anhydride, dispersability is increased and dissolution in gasoline becomes low, but flowability is decreased. Hence, it is preferred that maleic anhydride is used in the amount of about 2.0% by weight. Such thermoplastic elastomer may be appropriately used according to diverse applications, and in general, use of about 15–40% by weight of the elastomer leads to drastically increased impact resistance.

Examples of useful thermoplatic elastomers include polyethylene, polypropylene, polybutene, polyisoprene ethylene-propylene rubber, ethylene-propylene-diene rubber, ethylene-butene rubber, ethylene-octene rubber, ethylene-acryl rubber and styrene-ethylene-butylene-styrene copolymer.

As carbon black usable to render the composition electrically conductive, furnace black, Ketjen black, acethylene black and thermal black can be used. Of them, Ketjen black is the most preferable.

Additionally, it is preferred that carbon black has specific surface area (BET) of 500 $m^2/g$ or more and oil absorption (DBT) of 200 ml/100 g or more (Plastics Engineering/April '95, pp. 29–32; "Special Carbon Blacks for Plastics").

Although the conductive carbon black is used in different amounts according to its type, it ranges from 9 to 20% by weight, preferably. If possible, to obtain the objective electroconductivity by using small amounts of carbon black, processing conditions and combinations of material components should be optimized. When the amount of carbon black is less than 9% by weight, conductivity becomes poor. Whereas, when the amount exceeds 20% by weight, flowability, impact resistance and flexibility are drastically decreased. So, it is favorable that the conductivity is maximized by use of 20% by weight or less of carbon black.

The sulfonamide based material used to make the composition flexible has good affinity for polyamide and is mixed well, and is very effective in improvement of flexibility. Also, this material is not dissolved upon exposure to gasoline, and used in the amount of 1–10% by weight. Use of amounts less than 1% by weight results in poor effective flexibility. Meanwhile, if the amount exceeds 10% by weight, it is difficult to prepare the composition. In addition, the material can be volatilized at molding temperature upon preparation of final product, and the prepared final product may have poor external appearance owing to emergence of the material on the product surface.

As the representative sulfonamide based materials, use can be made of any one comprising N-propyl benzene sulfonamide, N-butyl benzene sulfonamide, N-hexyl benzene sulfonamide, N-octyl benzene sulfonamide, N-phenyl benzene sulfonamide, N-dimethylphenyl benzene sulfonamide, N-isopropylphenyl benzene sulfonamide, N-butylphenyl benzene sulfonamide, N-methyl methylbenzene sulfonamide, N-ethyl methylbenzene sulfonamide, N-butyl methylbenzene sulfonamide, N-butyl butylbenzene sulfonamide, N-butyl isopropylbenzene sulfonamide, N-butyl butylbenzene sulfonamide, N-phenyl methylbenzene sulfonamide, N-dimethylphenyl methylbenzene sulfonamide, and N-isopropylphenyl methylbenzene sulfonamide. Most preferably, N-butyl benzene sulfonamide is used. The composition prepared from the above components can be applied to various molded products, because of its good physical properties, namely, impact resistance, conductivity, flexibility and so on. In practice, rapid molding is performed to reduce preparation costs and to increase productivity. To meet such conditions, the composition itself should have high flowability favorable in terms of molding. With a view to realize the above goals, it is found that use of 0.001–0.02% by weight of dicarboxyl based material (formula 2) results in drastically increased flowability while maintaining all properties. If the amount is less than 0.1% by weight, flowability is minimally improved, whereas if the amount exceeds 0.3% by weight, workability in the extruder becomes lowered.

In addition, processing stabilizers, lubricants, antioxidants, brighteners, dispersants, nucleating agents may be added to obtain various effects, within the scope of the present invention.

Having generally described this invention, a further understanding can be obtained by reference to certain specific examples which are provided herein for purposes of illustration only and are not intended to be limiting unless otherwise specified.

EXAMPLES 1–7

(a) polyamide-6 resin or polyamide-66 resin having relative viscosity (measured for a solution of 1 g of sample in 100 ml of 96% sulfuric acid with Ubbelohde viscometer) of 3.0, (b) Ketjen black as a conductive carbon black, (c) N-butyl benzene sulfonamide as a softner, (d) thermoplastic elastomer and (e) dicarboxyl based material, were mixed at the ratios shown in the following table 1, using a single screw or a twin screw extruder. In these examples, a twin screw extruder having L/D of 30, supplied from Toshiba Corporation, was used. As such, the processing temperature was 240–280° C. and screw rotation rate was 200–300 rpm. The lace obtained through a nozzle from the mixed composition was cooled with water in a cooling bath, pelletized using a cutter, and then dried at 95° C. in a drier under nitrogen atmosphere for 5 hours, to prepare test pieces, which were then measured for various properties. The results are shown in Table 3, below.

COMPARATIVE EXAMPLES 1–5

In order to investigate the effect of compositions out of the range of the present invention, the compositions according to mixing ratios of the table 2 were prepared, and measured for their properties. The results are presented in Table 4, below.

TABLE 1

(unit: wt %)

| Composition | Example No. | | | | | | |
|---|---|---|---|---|---|---|---|
| | 1 | 2 | 3 | 4 | 5 | 6 | 7 |
| Polyamide-6 resin (#1) | 65.8 | 67.8 | 58.5 | | 49.5 | 49.8 | 45.8 |
| Polyamide-66 resin (#2) | | | | 52.5 | | | |
| Thermoplastic Elastomer (#3) | 20 | 15 | 25 | 30 | 30 | 35 | 35 |
| Carbon Black (#4) | 9 | 10 | 11 | 12 | 15 | 12 | 12 |
| Sulfonamide based Material (#5) | 5 | 5 | 5 | 5 | 5 | 3 | 7 |
| Dicarboxyl based Material (#6) | 0.2 | 0.2 | 0.5 | 0.5 | 0.5 | 0.2 | 0.2 |

1: pellet type polyamide-6 resin having relative viscosity of 3.0 measured for a solution of 1 g of resin in 100 ml of 96% sulfuric acid with Ubbelohde viscometer
2: pellet type polyamide-66 resin having relative viscosity of 2.8 measured for a solution of 1 g of resin in 100 ml of 96% sulfuric acid with Ubbelohde viscometer
3: Kraton FG 1901X, supplied from Shell Chemical
4: Vulcan XC-72, supplied from Cabot Corporation
5: N-butyl benzene sulfonamide
6: HOOC—(CH2)10-COOH

TABLE 2

(unit: wt %)

| Composition | Comparative Example No. | | | | | |
|---|---|---|---|---|---|---|
| | 1 | 2 | 3 | 4 | 5 | 6 |
| Polyamide-6 resin (#1) | 64.5 | 63.5 | | 53.8 | 52.8 | |
| Polyamide-66 resin (#2) | | | 53.0 | | | 44.5 |
| Thermoplastic Elastomer (#3) | 30 | 10 | 30 | 35 | 35 | 35 |
| Carbon Black (#4) | 15 | 11 | 12 | 8 | 12 | 12 |
| Sulfonamide based Material (#5) | | 5 | 5 | 3 | | 7 |
| Dicarboxyl based Material (#6) | 0.5 | 0.5 | | 0.2 | | 1.5 |

TABLE 2-continued (unit: wt %)

| Composition | Comparative Example No. | | | | | |
|---|---|---|---|---|---|---|
| | 1 | 2 | 3 | 4 | 5 | 6 |

1: pellet type polyamide-6 resin having relative viscosity of 3.0 measured for a solution of 1 g of resin in 100 ml of 96% sulfuric acid with Ubbelohde viscometer
2: pellet type polyamide-66 resin having relative viscosity of 2.8 measured for a solution of 1 g of resin in 100 ml of 96% sulfuric acid with Ubbelohde viscometer
3: Kraton FG 1901X, supplied from Shell Chemical
4: Vulcan XC-72, supplied from Cabot Corporation
5: N-butyl benzene sulfonamide
6: HOOC—(CH2)10-COOH

TABLE 3

Measurement of Properties (Examples)
(unit: wt %)

| Properties | Example No. | | | | | | |
|---|---|---|---|---|---|---|---|
| | 1 | 2 | 3 | 4 | 5 | 6 | 7 |
| Volume Resistivity, log(Rv)(Ω) #1 | 65.8 | 67.8 | 58.5 | | 49.5 | 49.8 | 45.8 |
| Flexible Elastic Modulus (Mpa) #2 | | | | 52.5 | | | |
| Tensile Fracture Elongation (%) #3 | 20 | 15 | 25 | 30 | 30 | 35 | 35 |
| Izod Impact Strength (kg · cm/cm) #4 | 9 | 10 | 11 | 12 | 15 | 12 | 12 |
| Melt Index (MI) #5 | 5 | 5 | 5 | 5 | 5 | 3 | 7 |

1: volume resistivity, measured with 40 × 40 × 3 mm square test piece using Ultra Megohmmeter (Japan TOA Co.) at 500 volt, 60 sec according to ASTM D-257, and shown as log value
2: measured with flexible strength piece according to ASTM D-790, the smaller the value, the more flexible the product
3: measured with tensile strength piece according to ASTM D-638
4: measured according to ASTM D-256, at notched state
5: measured at 275° C. under 2.16 kg load according to ASTM D-1238, at larger values, flowability is increased and thus moldability becomes more favorable

TABLE 4

Measurement of Properties (Comparative Examples)
(unit: wt %)

| Properties | C. Example No. | | | | |
|---|---|---|---|---|---|
| | 1 | 2 | 3 | 4 | 5 |
| Volume Resistivity, log(Rv)(Ω) #1 | 3 | 6 | 4 | 11 | 6 |
| Flexible Elastic Modulus (Mpa) #2 | 2000 | 2800 | 1000 | 700 | 1500 |
| Tensile Fracture Elongation (%) #3 | 12 | 10 | 40 | 110 | 25 |
| Izod Impact Strength (kg · cm/cm) #4 | 10 | 5 | 50 | 88 | 70 |
| Melt Index (MI) #5 | 9 | 12 | 1 | 7 | 0.3 |

1: volume resistivity, measured with 40 × 40 × 3 mm square test piece using Ultra Megohmmeter (Japan TOA Co.) at 500 volt, 60 sec according to ASTM D-257, and shown as log value
2: measured with flexible strength piece according to ASTM D-790, the smaller the value, the more flexible the product
3: measured with tensile strength piece according to ASTM D-638
4: measured according to ASTM D-256, at notched state
5: measured at 275° C. under 2.16 kg load according to ASTM D-1238, at larger values, flowability is increased and thus moldability becomes more favorable As described above, the electroconductive resin composition of the present invention has a volume resistivity of $10^5$ (log value=5) Ωcm or less and has excellent impact resistance. As well, the composition has the advantages of high flexibility and flowability, and superior moldability, thereby being applicable to electroconductive extrusion and injection components, in particular, fuel system components for motor vehicles.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An electroconductive resin composition, comprising:
   (a) 40–70% by weight of semi-crystalline polyamide resin;
   (b) 15–40% by weight of thermoplastic elastomer grafted with 0.5–2.0% by weight of maleic anhydride;
   (c) 9–20% by weight of carbon black powder;
   (d) 1–10% by weight of sulfonamide, represented by the following formula 1; and
   (e) 0.001–0.02% by weight of dicarboxylic acid represented by the following formula 2, $$R_1\text{—}SO_2\text{—}NH\text{—}R_2 \qquad \text{Formula 1}$$

(wherein, $R_1$ and $R_2$ are selected from the group consisting of alkyl, benzyl, phenyl, alkylphenyl and dialkylphenyl, wherein the alkyl is $C_nH_{2n+1}(n \leq 8)$)

$$HOOC(CH_2)_n\text{—}COOH. \qquad \text{Formula 2}$$

2. The composition as defined in claim 1, wherein the polyamide resin is selected from the group consisting of polyamide-6, polyamide-66, polyamide resin copolymers thereof, or mixtures thereof, and has a relative viscosity of 2.8–3.5.

3. The composition as defined in claim 1, wherein the carbon black is selected from the group consisting of furnace black, Ketjen black, acetylene black and thermal black, and has a specific surface area (BET) of 500 m²/g or more and an oil absorption (DBP) of 200 ml/100 g or more.

4. The composition as defined in claim 1, wherein the sulfonamide of the formula 1 is selected from the group consisting of N-propyl benzene sulfonamide, N-butyl benzene sulfonamide, N-hexyl benzene sulfonamide, N-octyl benzene sulfonamide, N-phenyl benzene sulfonamide, N-dimethylphenyl benzene sulfonamide, N-isopropylphenyl benzene sulfonamide, N-butylphenyl benzene sulfonamide, N-methyl methylbenzene sulfonamide, N-ethyl methylbenzene sulfonamide, N-butyl methylbenzene sulfonamide, N-butyl butylbenzene sulfonamide, N-butyl isopropylbenzene sulfonamide, N-butyl butylbenzene sulfonamide, N-phenyl methylbenzene sulfonamide, N-dimethylphenyl methyl benzene sulfonamide, N-isopropylphenyl methylbenzene sulfonamide, or mixtures thereof.

5. The composition as defined in claim 1, wherein the thermoplastic elastomer is selected from the group consisting of polyethylene, polypropylene, polybutene, polyisoprene ethylene-propylene rubber, ethylene-propylene-diene rubber, ethylene-butene rubber, ethylene-octene rubber, ethylene-acryl rubber, styrene-ethylene-butylene-styrene copolymer, or mixtures thereof.

6. The composition as defined in claim 1, wherein the relative viscosity of the semi-crystalline polyamide resin is measured for a solution of 1 g of resin in 100 ml of 96% sulfuric acid with Ubbelohde viscometer.

7. The composition as defined in claim 1, wherein the dicarboxylic acid of the formula 2 has an n-value ranging from 1 to 20.

8. A molded product for a motor component prepared from the resin composition of claim 1.

9. The product as defined in claim 8, wherein the motor component is a fuel filter housing or a fuel line.

10. A molded product for a motor component prepared from the resin composition of claim 7.

11. The product as defined in claim 10, wherein the motor component is a fuel filter housing or a fuel line.

* * * * *